United States Patent

Newman

Patent Number: 5,745,579
Date of Patent: Apr. 28, 1998

[54] CELLULAR TELEPHONE SECURITY ADAPTER AND METHOD

[75] Inventor: Marc Alan Newman, Tempe, Ariz.

[73] Assignee: Motorola, Inc., Schaumburg, Ill.

[21] Appl. No.: 840,923

[22] Filed: Apr. 25, 1997

[51] Int. Cl.$^6$ ................................................ H04L 9/10
[52] U.S. Cl. ....................... 380/52; 380/53; 380/59; 379/441; 379/447; 379/450; 455/550; 455/575; 455/90; 455/347; 455/349
[58] Field of Search ............................ 380/9, 52, 53, 380/59; 455/550, 575, 90, 347, 349, 350, 351; 379/441, 445, 447, 449, 450

[56] References Cited

U.S. PATENT DOCUMENTS

| | | | |
|---|---|---|---|
| 3,114,800 | 12/1963 | Simpkins | 380/53 |
| 4,593,155 | 6/1986 | Hawkins . | |
| 4,904,549 | 2/1990 | Goodwin et al. | 429/97 |
| 5,242,767 | 9/1993 | Roback et al. | 429/97 |
| 5,308,716 | 5/1994 | Shababy et al. | 429/97 |
| 5,366,826 | 11/1994 | McCormick | 429/96 |
| 5,517,683 | 5/1996 | Collett et al. . | |

*Primary Examiner*—Bernarr E. Gregory
*Attorney, Agent, or Firm*—Bradley J. Botsch, Sr.

[57] ABSTRACT

An adapter (10) for a cellular telephone includes a first coupling apparatus (21) disposed on a first surface (30) of the adapter (10). The first coupling apparatus (21) is for engaging coupling apparatus disposed on a rear surface of the cellular telephone. The adapter (10) also includes an earpiece (40) coupled to a side (33) of the adapter (10) and a second coupling apparatus (23, 24) disposed on a second surface (32) of the adapter (10). The second coupling apparatus (23, 24) engages coupling apparatus disposed on a power source. The earpiece (40) comprises a speaker electrically coupled to connections on a connector for tapping an external audio output of a cellular telephone. The speaker (40) is constrained to maintain a position within one-half centimeter of the side (33) of the adapter (10). An outer shell of the earpiece (40) is connected to the side (33) of the adapter (10) and protrudes therefrom by a distance of less than a centimeter.

9 Claims, 1 Drawing Sheet

CELLULAR TELEPHONE SECURITY ADAPTER AND METHOD

FIELD OF THE INVENTION

This invention relates in general to the field of cellular telephones, in particular to adapter modules for cellular telephones and more particularly to an improved speaker design for security modules for cellular telephones.

BACKGROUND OF THE INVENTION

Cellular telephones are increasingly popular and productive tools for enhancing abilities to communicate while traveling or from fixed locations, whether or not landline access is available in a given area. The ability to maintain a phone conversation while driving, during parking and while walking into or up to a building or other structure finds great utility for many users.

However, a number of problems have been presented to users of cellular telephones, such as undesired and unknown interception of cellular telephone conversations by others. The resultant embarrassment, loss of trade secrets and other factors has led users of cellular telephones to demand capability for encryption of such conversations. One approach to this has been to incorporate an encryption module that conveniently mounts between the cellular telephone battery and the body of the cellular telephone.

The internal circuitry of the cellular phone includes interconnections on the back of the cellular telephone body to allow the user to inject and extract audio signals, for example, to allow an encryption unit to capture an audio signal and encrypt the audio signal prior to transmission, and to allow the received signal to be decrypted and then provided as an audible signal to the user. A description of such an arrangement is included in U.S. Pat. No. 5,517,683, entitled "CONFORMANT COMPACT PORTABLE CELLULAR PHONE CASE SYSTEM AND CONNECTOR", issued to Collet et al., which is hereby incorporated herein by reference for teachings relative to physical and electrical interconnection of cellular telephones to external apparatus such as speakerphones and security modules.

A significant drawback of prior art approaches has been use of a hinged audio earpiece that extends around the body of the cellular telephone to the front of the cellular telephone, with wiring internal to the hinge and earpiece support for carrying electrical signals from the telephone body to the earpiece, which in turn provides audible signals in response thereto. This arrangement (i) subjects wiring to flexing each time the earpiece is folded around the telephone, leading to potential breakage of the wiring, (ii) requires catches etc. that are subject to breakage, (iii) causes a portion of the telephone to protrude from the phone in a fashion that encourages snagging of the protrusion on threads, twigs, wires etc. that may be in the vicinity of the telephone, (iv) increases the size of both the encryption unit and the cellular telephone so equipped, (v) increases the number of components within the encryption-equipped cellular telephone and (vi) increases the number of steps a user must take in preparing the cellular telephone for use.

Thus, practical, economical apparatus and methods for supplying audio signals to a user from a cellular telephone equipped with an adapter unit are needed.

DETAILED DESCRIPTION OF THE DRAWINGS

Figure 1:
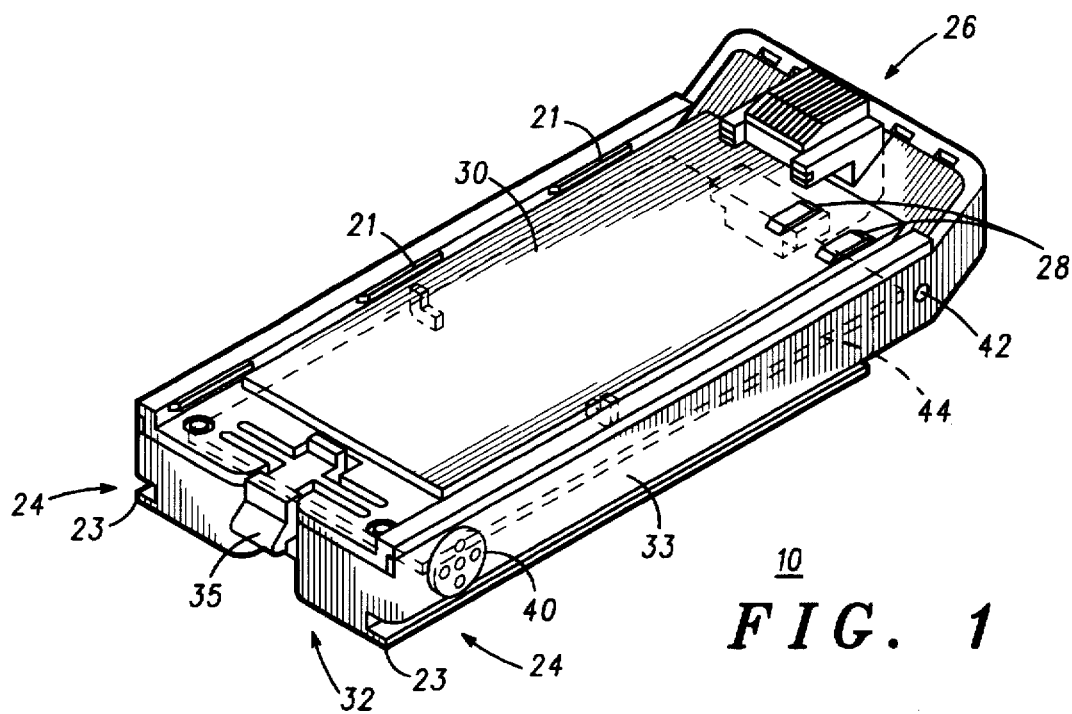
FIG. 1 is a simplified isometric view of a security module, in accordance with the teachings of the instant invention.

FIG. 1 is a simplified isometric view of adapter module 10, in accordance with the teachings of the instant invention. Adapter module 10 desirably includes tabs 21 disposed on one face thereof, for interlocking to the body of a MICRO TAC® cellular telephone (not illustrated), much as any other adapter module, amplified speakerphone arrangement or battery would attach to the body of the cellular telephone, and also includes rails 23 and groove 24 for coupling to a battery (not illustrated), both as described in conjunction with FIGS. 1a and 1b and associated text of U.S. Pat. No. 5,517,683, or as described in conjunction with FIGS. 2–8 and associated text of U.S. Pat. No. 5,308,716, issued to Shababy et al., which patents are hereby incorporated herein by reference for these teachings.

Adapter module 10 further desirably includes connector 26 and slide contact pads 28. Connector 26 engages an analogous connector (not illustrated) on the cellular telephone, allowing electrical interconnection of adapter module 10 to the cellular telephone, as described in conjunction with FIGS. 5a–5d, 8, 9a and 9b and associated text of U.S. Pat. No. 5,517,683, which patent is hereby incorporated herein by reference for these teachings. Slide contact pads 28 are provided at a predetermined location on first or upper surface 30 of adapter module 10 and correspond to slide contacts present on the rear surface of the cellular telephone (not illustrated) and are analogous to slide contacts present on the upper surface of the battery or power supply (not illustrated), which supply electrical power to adapter module 10 via analogous contacts (not illustrated) disposed on second or lower surface 32 of adapter module 10 that couple to and extract electrical power from the battery slide contacts when the battery is engaged via rails 23 and grooves 24. Slide contact pads 28 couple to the slide contacts on the cellular telephone and couple electrical power derived from the battery to the cellular telephone, as described in conjunction with FIG. 2 and associated text of U.S. Pat. No. 5,517,683, in conjunction with FIGS. 2–5 and associated text of U.S. Pat. No. 5,242,767, issued to Roback et al. and in conjunction with FIGS. 2–4 and associated text of U.S. Pat. No. 4,904,549, issued to Goodwin et al., which patents are hereby incorporated herein by reference for these teachings.

While the embodiment depicted in FIG. 1 is depicted as being adapted for coupling to a MICRO TAC® cellular telephone as manufactured by Motorola of Libertyville Ill., it will be appreciated that other arrangements may be usefully employed for (i) physically coupling adapter module 10 to a cellular telephone, (ii) electrically coupling adapter module 10 to an external speaker and/or microphone, (iii) physically coupling adapter module 10 to a cellular telephone power adapter or battery and (iv) electrically coupling adapter module 10 to the cellular telephone power adapter or battery and coupling the electrical energy therefrom to adapter module 10 and to the cellular telephone.

Adapter module 10 also usefully may include optional microphone 42, although this is not necessarily required, because the microphone included in the cellular telephone should provide adequate sensitivity even when the cellular telephone is used in combination with adapter module 10.

Figure 2:
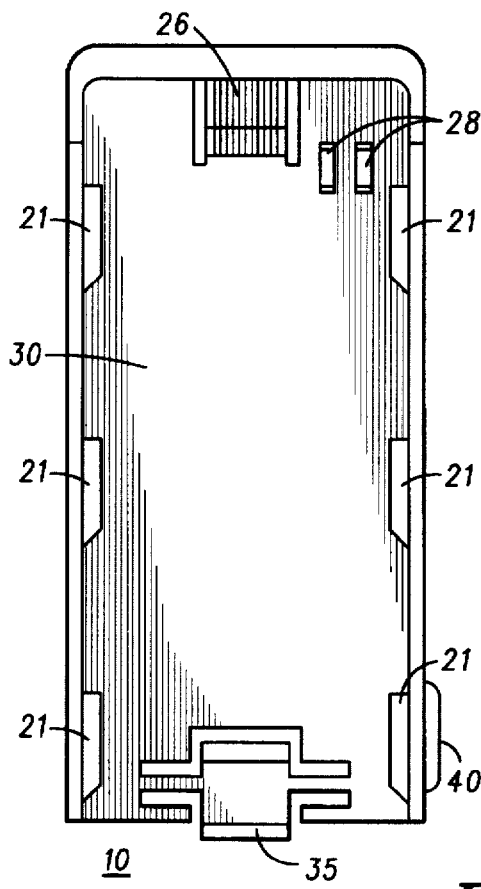
FIG. 2 is a simplified plan view of a security module, in accordance with the teachings of the instant invention.

FIG. 2 is a simplified plan view of adapter module 10, in accordance with the teachings of the instant invention. Integral latch mechanism 35 may be made as described in FIGS. 2–6 and associated text of U.S. Pat. No. 4,904,549, issued to Goodwin et al., which patent is hereby incorporated herein by reference for these teachings, or may be usefully adapted to couple to and latch to other types of cellular telephones.

FIG. 2 also depicts speaker 40 as protruding from adapter module 10. This arrangement has several advantages, such as (i) providing tactile feedback to the user that earpiece/speaker 40 is correctly positioned without requiring the user to adjust the position of earpiece 40 to optimize sound levels and (ii) reducing the number of parts, and especially the number of moving parts, associated with adapter module 10, (iii) increased reliability because wires are not required to traverse moving parts, (iv) increased user comfort, because the surface presented to the user's face is a smoother side surface, rather than a front surface including reliefs for keys, display and flip panel, (v) reduced awkwardness for adapter module 10 because adapter module 10 no longer includes an extended earpiece, (vi) increased ease of coupling and decoupling adapter module 10 to the battery and the cellular telephone and (vii) improved user comfort because the user's hand now presses against the narrower side, making the unit easier to hold.

Figure 3:
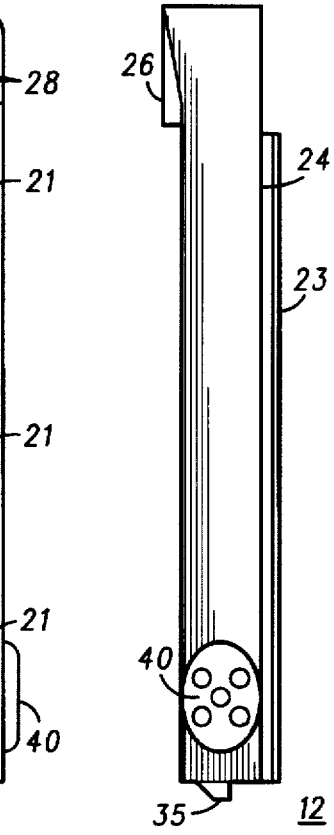
FIG. 3 is a simplified side view of a first preferred embodiment of a security module, in accordance with the teachings of the instant invention.

FIG. 3 is a simplified side view of first preferred embodiment 12 of adapter module 10, in accordance with the teachings of the instant invention. FIG. 3 illustrates a preferred embodiment of earpiece 40, and also illustrates how earpiece 40 facilitates appropriate positioning of earpiece 40 vis-a-vis a user's ear.

Figure 4:
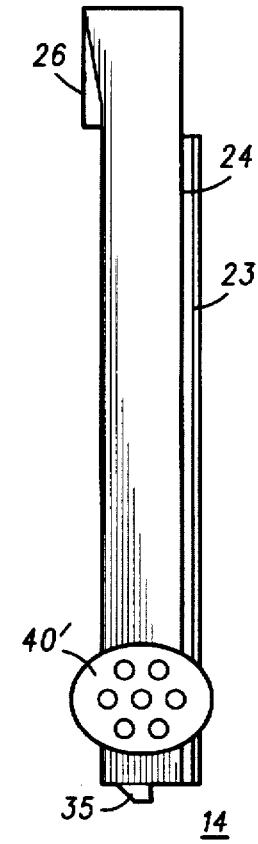
FIG. 4 is a simplified side view of a second preferred embodiment of a security module, in accordance with the teachings of the instant invention.

FIG. 4 is a simplified side view of second preferred embodiment 14 of adapter module 10, in accordance with the teachings of the instant invention. The embodiment of FIG. 4 shows that large earpieces 40' may also be accommodated by this design, because neither the cellular telephone or the battery extends beyond the side of adapter module 10.

It will be appreciated that adapter module 10 may comprise any of a broad variety of equipments that have utility when coupled to a cellular or portable telephone. In a first embodiment, adapter module 10 comprises an encryption and decryption unit for providing information security in use of the cellular telephone to transmit and receive voice signals or data. In other preferred embodiments, adapter module 10 includes an electronics card 44 (FIG. 1) consistent with the design and electrical definition of a PCMCIA Type 1, Type 2 or Type 3 electronics card. Accommodation of an electronics card of varying definition permits the electrical functions and features of adapter module 10 and the associated cellular telephone to be fundamentally enhanced. For example, electronics card 44 may provide an air-LAN interface, thus allowing the cellular communications capability of the cellular telephone to include establishment of a remote LAN connection in support of physically separated computer equipment.

Alternatively, adapter module 10 could include a memory such as a flash or disc memory, permitting storage and transmission of large amounts of data via a cellular telephone. Other functions that may be accommodated via adapter module 10 include GPS reception and location determination, multifunction modem capability for facilitating data and/or facsimile transmission and reception, a paging system for permitting reception of short messages and providing a predialing for return calls capability or a video interface for facilitating transmission and reception of video data.

Thus, an improved adapter such as a security module for a cellular telephone has been described which overcomes specific problems and accomplishes certain advantages relative to prior art methods and mechanisms. The improvements over known technology are significant. The complexities, moving parts and high parts counts of the prior art are avoided. Similarly, a smaller unit requiring fewer steps in deployment and usage has been provided. Additionally, positive tactile/mechanical feedback indicative of appropriate earpiece positioning is provided to the user.

The foregoing description of the specific embodiments will so fully reveal the general nature of the invention that others can, by applying current knowledge, readily modify and/or adapt for various applications such specific embodiments without departing from the generic concept, and therefore such adaptations and modifications should and are intended to be comprehended within the meaning and range of equivalents of the disclosed embodiments.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

I claim:

1. An adapter for use with a cellular telephone, said adaptor comprising:
   a first coupling apparatus disposed on a first surface of said adapter, said first coupling apparatus for engaging said adapter to a surface of said cellular telephone;
   a fixed earpiece fixedly attached to a side of said adapter near a first end of said side; and
   a second coupling apparatus disposed on a second surface of said adapter, said second coupling apparatus for engaging said adapter to a power source.

2. An adapter as claimed in claim 1, wherein said earpiece further includes an earpiece fixedly attached to a side of said adapter.

3. An adapter as claimed in claim 1, wherein said adapter further includes a microphone coupled to said side of said adapter at an end of said side remote from said first end.

4. An adapter as claimed in claim 1, wherein said earpiece comprises:
   a speaker electrically coupled to connections on a connector for tapping an external audio output of a cellular telephone, wherein said speaker is constrained to maintain a position within one-half centimeter of said side of said adapter; and
   an outer shell connected to said side of said adapter and protruding therefrom by a distance of less than a centimeter.

5. An adapter as claimed in claim 1, wherein said second coupling apparatus disposed on said second surface of said adapter includes a rail and an adjacent groove, said second coupling apparatus for engaging coupling apparatus disposed on a battery for a cellular telephone.

6. An adapter as claimed in claim 1, wherein said first coupling apparatus disposed on said first surface of said adapter includes rails, said first coupling apparatus for engaging coupling apparatus disposed on a rear surface of said cellular telephone for engaging a cellular telephone battery.

7. An adapter for a cellular telephone, said adapter including:
- a first coupling apparatus disposed on a first surface of said adapter, said first coupling apparatus for engaging said adapter to a rear surface of said cellular telephone;
- an earpiece fixedly attached to a side of said adapter near a first end of said side;
- a second coupling apparatus disposed on a second surface of said adapter, said second coupling apparatus for engaging said adapter to a power source; and
- a microphone coupled to said side of said adapter at an end of said side remote from said first end.

8. An adapter as claimed in claim 7, wherein said earpiece comprises:
- a speaker electrically coupled to connections on a connector for tapping an external audio output of a cellular telephone, wherein said speaker is constrained to maintain a position within one-half centimeter of said side of said adapter; and
- an outer shell connected to said side of said adapter and protruding therefrom by a distance of less than a centimeter.

9. An adapter as claimed in claim 7, wherein:
- said second coupling apparatus disposed on said second surface of said adapter includes a rail and an adjacent groove, said second coupling apparatus for engaging coupling apparatus disposed on a battery for a cellular telephone; and
- said first coupling apparatus disposed on said first surface of said adapter includes rails, said first coupling apparatus for engaging coupling apparatus disposed on a rear surface of said cellular telephone for engaging a cellular telephone battery.

* * * * *